June 30, 1970 R. FESSARD 3,518,362

DEMODULATING CIRCUIT FOR WAVES FREQUENCY MODULATED BY SIGNALS OF THE VIDEO TYPE

Filed Feb. 27, 1967

INVENTOR.
ROLAND FESSARD
BY Kurt Kelman
AGENT

United States Patent Office 3,518,362

Patented June 30, 1970

3,518,362

DEMODULATING CIRCUIT FOR WAVES FREQUENCY MODULATED BY SIGNALS OF THE VIDEO TYPE

Roland Fessard, Asnieres, France, assignor to Compagnie Francaise de Television, a corporation of France Filed Feb. 27, 1967, Ser. No. 618,754
Claims priority, application France, Mar. 3, 1966, 52,075
Int. Cl. H04n *5/58, 9/48*
U.S. Cl. 178—5.4 5 Claims

ABSTRACT OF THE DISCLOSURE

In order to ensure proper demodulation of a wave frequency modulated by signals of the video type containing periodic time intervals during which the signal is not transmitted, referred to as blanking intervals, and to enable proper restoration of the DC, component of said video type signals after demodulation there is provided an auxiliary circuit for substituting for said wave to be demodulated during at least a part of at least some of said blanking intervals a signal, referred to as calibrating signal, having a constant frequency for at least the duration of said part of said blanking interval.

Figure 1:
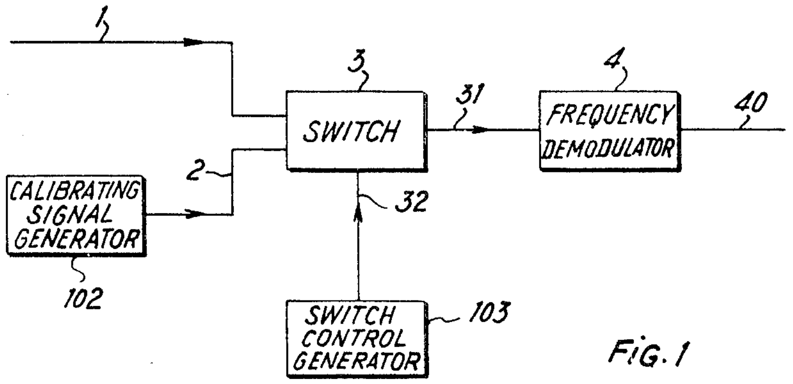

The present invention relates to demodulating circuits for waves frequency modulated by signals of the video type, wherein the restoration of the DC (direct current) component is required. The term DC component is employed here in the sense used in television, that is the whole of the very low frequency range.

The term, "signal of the video type" is used here to designate television video signals and more generally signals:

(a) Whose spectrum extends from the very DC component, i.e., zero frequency, up to a limit frequency, generally of the order of several megacycles/sec., and (b) Which present, moreover, the particularity that their transmission is discontinuous and interrupted during recurrent time intervals referred to as "blanking intervals." In the case of conventional television signals these blanking intevrals are the horizontal and vertical blanking intervals. Such a discontinuous signal transmission may also be found in telemetering.

Such signals are generally advantageously transmitted by frequency modulated waves; however it is sometimes difficult under these conditions to design for the receiving and a frequency demodulator having sufficiently stable characteristics for delivering a correct DC component.

On the other hand, the signal supplied by the demodulator is not always utilized directly and is often applied to circuit elements improper to transmit correctly the DC component. In particular, when the signal must be amplified, it is desirable to avoid the well known difficulties inherent to DC amplifiers.

It is then necessary to proceed subsequently to the restoration of the DC component.

Means that permit to restore the DC component of a video signal are well known; they are designated by the term "clamping devices."

Clamping devices, known in the art, utilize for example an electronic switch controlled by locally produced clamping pulses. Other simplified devices comprise a diode for clamping the signal amplitude peaks such as the sync pulses included in a complete television signal.

These devices are based on the principle that the error between the original value of the signal and its actual value after the loss of the DC component may be considered as constant from one clamping period to the other.

These devices operate by bringing the transmitted signal voltage to a determined value, referred to as "clamping voltage," during time intervals referred to as "clamping periods" included in the blanking intervals.

For a correct operation of those devices in the prior art the signal transmitted must present, during the blanking intervals, "reference levels " of a determined nominal value; these levels are for example, the blanking levels transmitted before and after the horizontal sync pulses in a television standard signal.

By clamping, drifts inherent to circuit elements may be corrected, but parasitic signals such as those caused, for example, by interference or by noise inherent to any transmission, may affect the reference levels and perturb the operation of the device completely.

The present invention permits to remedy the abovementioned drawbacks and, moreover, permits to effect the clamping even if, during the blanking intervals, no reference level is transmitted.

In accordance with the present invention there is provided a demodulating circuit for a wave frequency modulated by a signal of the video type, whose transmission is interrupted during recurrent time intervals, referred to as blanking intervals, during which said frequency modulated wave is either suppressed or modulated in any manner, said circuit comprising: a main input for receiving said frequency modulated wave; and at least one frequency demodulator, having an input; wherein there is provided an auxiliary circuit for adding to or substituting for said frequency modulated wave, during recurrent time intervals, referred to as calibration periods, each of said calibration periods being included within a blanking interval, a signal referred to as calibrating signal, whose frequency is constant during each of said calibration periods; said auxiliary circuit having an input coupled to said main input and an output coupled to said input of said frequency demodulator.

The output signal provided by the above demodulator during the calibration periods may be utilized for further clamping the viedo signal without the aforementioned drawbacks.

Figure 2:
Figure 3:
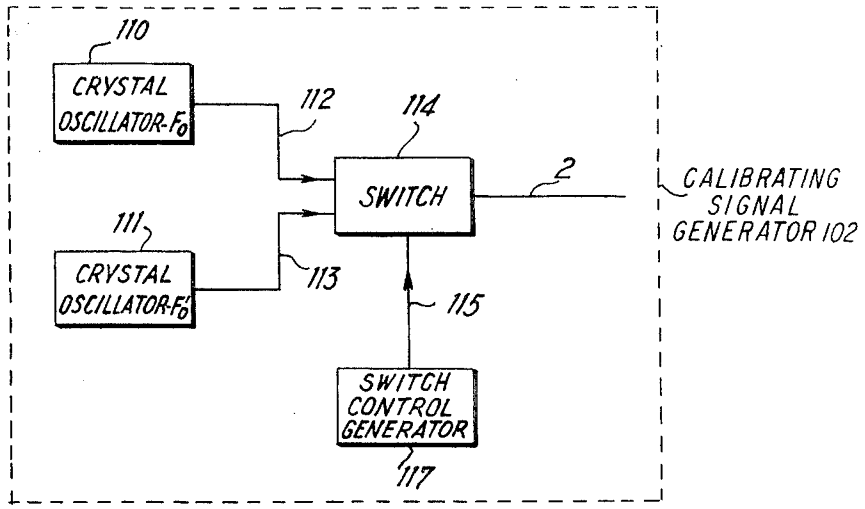

The invention will be better understood from the following description in connection with the accompanying drawings in which:

FIG. 1 illustrates a preferred embodiment of a circuit according to the invention, FIG. 2 shows the shape of the wave demodulated by the circuit of FIG. 1, and FIG. 3 illustrates a calibrating signal generator employed in the circuit of FIG. 1.

The invention will be described in the non-limitative example of application to chrominance signals of the SECAM television system in which the subcarrier wave, carrying the chrominance information, has a resting (or center) frequency $F_0$ or $F_0'$ depending on whether it is frequency modulated by one or the other of the two chrominance signals $A_1$ or $A_2$ which alternate with each other at the line frequency.

In FIG. 1, there is represented an electronic switch 3 having two signal inputs 1 and 2, a control input 32 and an output 31.

Input 1 constitutes the input of the circuit and receives the subcarrier which is frequency modulated by the chrominance signals $A_1$ and $A_2$ that alternate with each other at the line frequency, the resting frequency of the subcarrier being $F_0$ for the lines during which signal $A_1$ is transmitted, and $F_0'$ for the lines during which signal $A_2$ is transmitted.

The subcarrier is derived, in the known manner, by means of a band pass filter, from the composite video signal of a colour television picture and applied to a filler, referred to as decoding filter if, as it is the case here, the modulated subcarrier has been applied at the transmitter to a filter, referred to as coding filter, whose gain characteristic increases very sharply on both sides of a predetermined frequency in the frequency excursion range of the subcarrier, the decoding filter having a characteristic which is the inverse of that of the coding filter.

The input 2 of switch 3 receives a calibrating signal of constant amplitude, supplied by a calibrating signal generator 102. This calibrating signal is formed by a signal of frequency $F_0$ during the line periods corresponding to the transmission of signal $A_1$ and by a signal of frequency $F_0'$ during the line periods corresponding to the transmission of signal $A_2$.

The electronic switch 3 connects one or the other of the signal inputs 1 and 2 to the output 31 depending on its state which is determined by the value of the control signal supplied by a control signal generator 103 and applied to the control input 32.

The output 31 of switch 3 is connected to a frequency demodulator 4 centered, for example, on the frequency $(F_0+F_0')/2$.

The output 40 of demodulator 4 constitutes the output of the circuit.

Referring to the diagram of FIG. 2, the circuit operates in the following manner:

The total duration of a line period is the sum of the duration J of the line blanking interval (of the order of 11 microseconds) and the active line duration L, that is the time during which the subcarrier is effectively modulated by a chrominance signal. On the diagram of FIG. 2 only the beginning and end of the active line duration are represented and connected therebetween by a dotted line.

Except during the calibration periods, switch 3 transmits to its output terminal 31 the signal which is being applied to input 1 of the circuit, and this signal is demodulated by demodulator 4.

During the calibration periods of duration E, the state of switch 3 is changed and the switch transmits to the output terminal 31 the calibrating signal which is applied to input 2. Then the signal at the output 40 of demodulator 4 has the shape represented in FIG. 2. During the useful portion of the line this signal is formed by the signals $A_1$ and $A_2$ which are then transmitted, whereas during the time interval E the signal has a constant value that changes alternately from one line to the other and corresonds to either one of the resting frequencies $F_0$ and $F_0'$, respectively. Indeed, this constant value signal is not affected by parasitic signals due, for example, to a long distance transmission which may, on the contrary, affect the line blanking period outside the calibration period.

The video signal thus obtained at the output 40 is perfectly suitable for use in a further clamping device. It suffices, indeed, that the clamping periods be included in the calibration periods for a conventional clamper to ensure a satisfactory D.C. restoration, since the signal presents a well determined level during the calibration periods.

The control signals, supplied by generator 103 are pulses that coincide with the calibration periods. Generator 103 is preferably a monostable multivibrator, triggered by the line sync pulses which, in the example given, are derived in the conventional manner from the composite video signal.

FIG. 3 shows an embodiment of the calibrating signal generator 102 of FIG. 1. This generator comprises two crystal oscillators 110 and 111 oscillating on the frequencies $F_0$ and $F_0'$, respectively, and supplying respectively signals to the inputs 112 and 113 of an electronic switch 114 which is further provided with a control input 115 and an output 2, which is here identical to the input 2 of switch 3 in FIG. 1. A control signal at one half of the line frequency, supplied by a control signal generator 117, is applied to control input 115 of the switch 114 and makes it change its state at the beginning of each line duration. Thus switch 114 transmits alternately to its output 2 the signal with frequency $F_0$ applied to its input 112 and the signal with frequency $F_0'$ applied to its input 113.

The design of generator 117 delivering control signals at one half of the line frequency calls upon the known art aplied in the "SECAM" system.

Of course, the invention is not limited to the embodiments hereinbefore described and shown, in particular when it is used for the reception of chrominance signals of the SECAM system, the output 31 of switch 3 of FIG. 1 can be used to feed a conventional SECAM signal decoding circuit, comprising, according to the known art, a direct channel, a delay channel and an electronic switch fed by both the direct and the delay channel and supplying two signals respectively modulated by signals $A_1$ and $A_2$. In this case two demodulators are used respectively affected to restore signals $A_1$ and $A_2$.

What is claimed is:

1. A demodulating circuit for a wave having a single resting frequency and frequency modulated by a signal of the video type, whose transmission is interrupted during recurrent time intervals, referred to as blanking intervals, during which said frequency modulated wave is either suppressed or modulated in any manner, said circuit comprising: a main input for receiving said frequency modulated wave; and at least one frequency demodulator, having an input; wherein there is provided an auxiliary circuit, for substituting for said frequency modulated wave, during recurrent time intervals, referred to as calibration periods each of said calibration periods being included within a blanking interval, a signal referred to as calibrating signal, whose frequency is constant during each of said calibration periods and equal to said resting frequency; said auxiliary circuit having an input coupled to said main input and an output coupled to said input of said demodulator.

2. A demodulating circuit as claimed in claim 1, wherein said auxiliary circuit comprises: means for generating a signal having a constant frequency equal to said resting frequency within each calibration period, said generating means having an output; a switch, referred to as calibration switch, having a first and a second signal input respectively coupled to said main input and to said output of said generating means, and an output coupled to said input of said frequency demodulator; and control means for causing said calibration switch to couple said input of said frequency demodulator to said output of said generating means during said calibration periods and to said main input during the transmission periods of said signal of the video type.

3. A demodulating circuit for a color subcarrier wave having alternately two resting frequencies $F_0$ and $F_0'$, frequency modulated by respective color signals $A_1$ and $A_2$, whose transmission is interrupted during recurrent time intervals, referred to as blanking intervals, during which said frequency modulated wave is either suppressed or modulated in any manner, said circuit comprising: a main input for receiving said frequency modulated wave; at least one frequency demodulator having an input; and an auxiliary circuit for substituting for said frequency modulated wave, during recurrent time intervals, referred to as calibration periods, each of said calibration periods being included within a blanking interval, a signal referred to as calibrating signal, whose frequency is constant during each of said calibration periods; said auxiliary circuit having an input coupled to said main input and an output coupled to said input of said demodulator, said calibrating signal having a frequency equal to $F_0$ during calibration periods included within blanking intervals preceding the transmission of said color signal $A_1$ and a frequency equal to $F_0'$ during calibration periods included within blanking intervals preceding the transmission of said color signal $A_2$.

4. A demodulating circuit as claimed in claim 3, wherein said auxiliary circuit comprises: a first and a second oscillator respectively oscillating at frequency $F_0$ and at frequency $F_0'$, said oscillators having respective outputs; a first switch having two signal inputs respectively coupled to said outputs of said oscillators, and an output; a second switch having a first and a second signal inputs respectively coupled to said main input and to said output of said first switch, and an output coupled to said input of said frequency demodulator; first control means for causing said first switch to couple said second input of said second switch alternately to the output of said first oscillator and to the output of said second oscillator; and second control means for causing said second switch to couple said input of said frequency demodulator to said output of said first switch during said calibration periods and to said main input during the transmission period of said color signals.

5. A demodulating circuit as claimed in claim 3, wherein said oscillators comprise at least one crystal oscillator.

References Cited

UNITED STATES PATENTS 3,147,441 9/1964 Adler -------------- 325—344

ROBERT L. GRIFFIN, Primary Examiner

J. C. MARTIN, Assistant Examiner

U.S. Cl. X.R.

178—7.3